(12) United States Patent
Attard et al.

(10) Patent No.: US 10,280,096 B2
(45) Date of Patent: May 7, 2019

(54) WIPER BLADE ASSEMBLY FOR A GREASE RECOVERY DEVICE

(71) Applicants: Christian Attard, Down (GB); Cormac Fitzpatrick, Down (GB)

(72) Inventors: Christian Attard, Down (GB); Cormac Fitzpatrick, Down (GB)

(73) Assignee: F M ENVIRONMENTAL LIMITED, Down, Northern Ireland (IE)

(*) Notice: Subject to any disclaimer, the term of this patent is extended or adjusted under 35 U.S.C. 154(b) by 0 days.

(21) Appl. No.: 15/639,074

(22) Filed: Jun. 30, 2017

(65) Prior Publication Data
US 2018/0002195 A1    Jan. 4, 2018

(30) Foreign Application Priority Data

Jun. 30, 2016 (GB) .................................. 1611495.1

(51) Int. Cl.
| | |
|---|---|
| *C02F 1/40* | (2006.01) |
| *E03F 5/16* | (2006.01) |
| *B01D 17/02* | (2006.01) |
| *B01D 17/04* | (2006.01) |

(52) U.S. Cl.
CPC .............. *C02F 1/40* (2013.01); *B01D 17/0214* (2013.01); *B01D 17/041* (2013.01); *E03F 5/16* (2013.01)

(58) Field of Classification Search
CPC .......... C02F 1/40; E03F 5/16; B01D 17/0214; E02B 15/103

USPC ......................................... 210/523, 540, 776
See application file for complete search history.

(56) References Cited

U.S. PATENT DOCUMENTS

| | | | | |
|---|---|---|---|---|
| 5,133,881 A | * | 7/1992 | Miller | B01D 17/0214 210/776 |
| 5,360,555 A | * | 11/1994 | Batten | B01D 17/0214 210/540 |
| 6,800,195 B1 | * | 10/2004 | Batten | B01D 17/0214 210/523 |
| 7,296,694 B2 | * | 11/2007 | Weymouth | B01D 17/0214 210/540 |
| 2007/0045182 A1 | * | 3/2007 | Chapin | E03F 5/16 210/540 |
| 2018/0002196 A1 | * | 1/2018 | Attard | C02F 1/40 |

* cited by examiner

*Primary Examiner* — Christopher Upton
(74) *Attorney, Agent, or Firm* — Nadya Reingand; Yan Hunkin

(57) ABSTRACT

A grease recovery device 1 having a container 2 with walls 3 and a lid. The grease recovery device 1 further having a drum 5 for lifting fats, oils, grease and/or solids (FOGS) rotatably mounted on the container 2 and a wiper blade assembly 6. The wiper blade assembly 6 being in operable engagement with the drum 5. A wall 3 of the container 2 has an arrangement 7 for releasably housing the wiper blade assembly 6 in an operational position in the container 2. The releasable housing arrangement 7 comprising an opening 8 for slidably receiving the wiper blade assembly 6 and a support arrangement 9 disposed at or about the opening 8 so as to allow the wiper blade assembly 6 to be inserted into and removed from the grease recovery device 1 without removing the lid or opening any cover of the container 2.

22 Claims, 2 Drawing Sheets

WIPER BLADE ASSEMBLY FOR A GREASE RECOVERY DEVICE

CROSS-REFERENCE TO RELATED APPLICATIONS

This patent application claims the benefit of GB 1611495.1 file on Jun. 30, 2016, which is hereby incorporated by reference in its entirety.

FIELD OF INVENTION

The present invention relates to a grease recovery device; in particular a wiper blade assembly for a grease recovery device.

BACKGROUND

Grease recovery devices/grease traps are widely used in commercial settings to remove fats, oils, grease and solids (FOGS) from a body of water. Grease recovery devices are designed to trap and remove grease and the like that is discharged to drainage during the cooking and cleaning up processes in a commercial kitchen. In a typical arrangement, the grease recovery device will have a liquid storage container with an inlet coupled to a sink drain and an outlet coupled to the wastewater outlet pipe for the building/setting where the sink is located. Conventionally the trapped FOGS are removed using a skimming drum. Wiper blade assemblies are conventionally used to skim the grease or the like off the drum as it is picked up from the surface of the trapped waste inside the grease recovery device main tank. The FOGS skimmed by the wiper blade assembly are deposited into a collection container positioned externally from the conventional grease recovery device. This external container is then emptied by kitchen operators. However, the conventional wiper blade assembly is required to be removed and cleaned at least once daily. This removal of the wiper blade assembly entails that the grease recovery device lid or at least a portion of the lid be opened. This opening of the main container structure risks waste contaminates and odours exiting from the grease recovery device and into the surrounding environment. This discharge of waste contaminates and odours into the surrounding kitchen environment increases the risk of cross contamination of foods within the kitchen and also increases the risk of infection and/or intoxication of the grease recovery device operators.

It is an object of the present invention to provide a grease recovery device which is more user friendly and reduces the risk of further contaminate exiting from the grease recovery device into the environment during the cleaning process of the wiper blade assembly component.

SUMMARY

Accordingly, the present invention provides a grease recovery device having a container with walls and a lid and a drum for lifting fats, oils, grease and/or solids (FOGS) rotatably mounted on the container, a wiper blade assembly in operable engagement with the drum, a wall of the container having an arrangement for releasably housing the wiper blade assembly in an operational position in the container, the releasable housing arrangement comprising an opening for slidably receiving the wiper blade assembly and a support means disposed at or about the opening, the support means comprising means for locating and releasably retaining the wiper blade assembly on the support means of the container so as to allow the wiper assembly to be inserted into and removed from the grease recovery device without removing the lid or opening any cover of the container.

Preferably, the wiper blade assembly comprising a leading end formed for operational engagement with the drum.

Ideally, the wiper blade assembly comprising a trailing end formed for mounting the wiper blade assembly on the wall, Preferably, the trailing end of the wiper blade assembly having engagement means for releasably engaging the support means of the releasable housing arrangement, Advantageously, the wiper blade assembly and the releasable housing arrangement are adapted to allow plug and plug operation of the wiper blade assembly in the grease recovery device as well as a quick release operation to remove the wiper assembly from the wall of the container for cleaning. Furthermore, removing the requirement to access the inside of the grease recovery device eliminates the risk of waste contaminates and odours exiting from the grease recovery device and into the surrounding environment. This discharge of waste contaminates and odours into the surrounding kitchen environment increases the risk of cross contamination of foods within the kitchen and also increases the risk of infection and/or intoxication of the grease recovery device operators.

Preferably, the releasable housing arrangement provides the opening as an elongate slot.

Ideally, the length/width of the opening is formed to be sufficient for receiving the widest part of the wiper blade assembly to be inserted into the container.

Preferably, the depth of the opening is formed to be sufficient for receiving the part of the wiper blade assembly having the greatest depth to permit the wiper blade assembly to be inserted at a sufficient angle to make contact with the curvature of the skimming means.

Ideally, the length/width of the opening is in the range of 60 mm to 250 mm

Preferably, the depth of the opening is in the range of 10 mm to 60 mm.

Ideally, the opening is located just below the top of the drum in the wall of the container.

Preferably, the angle of the plane upon which the wiper blade assembly is positioned is between 10-35 degrees, offset from a virtual horizontal plane. That's to say if an "X" axis is taken as the horizontal plane, the wiper blade assembly is angled between 10-35 degrees below X.

Ideally, the drum, in addition to skimming grease acts as a guide for the wiper blade.

Preferably, the drum acts as both a means of guidance for the wiper blade assembly's leading end during insertion/removal.

Ideally, the drum also acts as a means of stabilisation for the wiper blade assembly in use.

Preferably, the drum also contributes in part to the required resting angle at the leading end of the wiper blade assembly.

Ideally, the weight of the wiper blade is such that it exerts its own downward pressure on the drum. This downward pressure is sufficient to improve the pressure of contact and in turn leads to maximum liquid transfer from the drum to the blade.

Preferably, the support means comprises at least one lateral support member disposed at or about one lateral edge of the opening on the outside of the container, the lateral support member having means for releasably locating and retaining the engagement means of the trailing end of the wiper blade assembly.

Ideally, the lateral support member comprises a plate extending away from the wall of the container in a direction away from the drum.

Preferably, the plate has a blind channel formed through at least part the body of the plate from a free edge of the plate for guiding the engagement means of the wiper blade assembly into the plate and along the channel to a final operational position.

Ideally, at least part of the channel is a curvilinear channel having a sufficient angle of curvature for preventing the wiper blade assembly sliding out of the channel under its own weight or otherwise.

Ideally, the channel terminates in the body of the plate in such a way as to create a groove for releasably retaining the engagement means of the wiper blade assembly.

Preferably, the groove has the body of the plate on one side and a ridge on the other side of the groove creating an operational location for the engagement means of the wiper blade assembly.

Advantageously, this channel terminating in a groove provides a means for allowing plug and play operation of the wiper blade assembly into the container. The curvilinear channel allows the operator to push the wiper blade assembly into and around the channel in a smooth continuous way into a final operational position in a groove at the end of the channel.

Ideally, the groove provides a stop to the travel of the wiper blade assembly in a direction towards or away from the drum.

Preferably, the channel has an initial rectilinear portion leading into the body of the plate.

Ideally, the rectilinear portion ends with a first bend, most preferably a right angle bend turning up into the body of the plate creating a first curvilinear portion of the channel.

Preferably, the first bend straightens into a second upwardly extending linear, most preferably rectilinear portion of the channel.

Ideally, the second linear portion terminates in a second bend portion initially bending back towards the inlet of the channel and finally bending down towards the first rectilinear portion creating the groove.

In use an operator must lift the trailing end of the wiper blade assembly up and out of the groove to remove the wiper blade assembly from the container.

Advantageously, the groove prevents movement of the wiper blade assembly towards and/or away from the drum without user intervention.

Preferably, the support means comprises a lateral support member disposed at or about each lateral edge of the opening on the outside of the container.

Ideally, a plate is disposed at or about each lateral edge of the opening on the outside of the container.

Preferably, the support means comprising a lateral support member disposed at or about each lateral edge of the opening provides greater stability for the wiper blade assembly during use.

By use we mean during insertion, removal or the in use operational position of the wiper blade assembly.

Ideally, the support means comprises a base member disposed along all or part of the opening for guiding the wiper blade assembly forwards and into/backwards and out of the opening for insertion/removal of the wiper blade assembly into and from the container.

Preferably, the base member extends between the lateral support means.

Ideally, the base member extends along all or part of the bottom of the opening.

Preferably, the base member extends between the bottom portion of the lateral support members.

Ideally, the base member is fixed to the container wall along at least part of its length.

Preferably, the base member is mechanically coupled to the container wall along at least part of its length.

Most preferably, the base member is strapped, clipped, slotted, riveted, bonded, adhesively bonded, adhered, glued or welded to the container wall or coupled to the container wall using any combination of these fasteners or fixing methods.

It will be appreciated that this list of coupling means/methods is in no way limiting and the invention covers any form of coupling suitable to provide sufficient rigidity and strength to retain the mechanical joint between the base plate and the container wall to withstand the range of forces acting on the base plate.

Ideally, the base member inclines upwards towards the opening to facilitate the inclined angle of the wiper blade assembly. The technical reason for the angle/incline is to ensure viscous fluids (fats, oils and grease) flow more efficiently by gravity. Any shallower angle or incline would lead to reduced gravity and reduced flow velocity of these viscous fluids. In that undesired scenario, many such fluids which are previously liquefied by a heating process within the tank will pass more slowly along the blades length for an extended period of time to the extent that they may also cool and solidify on the blade, thereby forming an obstruction to further fluid passage.

Preferably, the base member is a base plate.

Ideally, the trailing end of the wiper blade assembly has at least one laterally protruding male member formed for slidable engagement with the channel of the plate.

Preferably, the trailing end of the wiper blade assembly has two laterally protruding male members formed for slidable engagement with the channels of the plates.

Ideally, the trailing end of the wiper blade assembly has a handle for inserting and removing the wiper blade assembly to and from the container.

Preferably, the handle is a bar extending beyond the wiper blade assembly to provide the two male members.

Ideally, the trailing end of the wiper blade assembly has locating means on opposite ends thereof for locating the handle.

Preferably, the engagement means of the of the wiper blade assembly is a distance from the drum engageable portion of the wiper blade assembly such that the drum engageable portion of the wiper blade assembly is in operational engagement with the drum of the grease recovery device when the engagement means of the wiper blade assembly are engaged within the channel in normal use.

Ideally, the engagement means of the of the wiper blade assembly is a distance from the drum engageable portion of the wiper blade assembly such that the drum engageable portion of the wiper blade assembly is in operational engagement with the drum of the grease recovery device when the engagement means of the wiper blade assembly are engaged within the groove of the channel in normal use Ideally, the engagement means of the trailing end of the wiper blade assembly is a distance from the drum engageable portion of the leading end of the wiper blade assembly such that the drum engageable portion of the leading end is in operational engagement with the drum of the grease recovery device when the engagement means of the trailing end are engaged within the groove of the channel in normal use.

Ideally, the leading end of the wiper blade assembly makes direct contact with the drum. When viewing the drum from either end face, and placing a virtual vertical axis through the centre line of the drum, the blade must rest within the upper semi-cylinder portion, at a point on the circumference that is >=10 degrees but =<45 degrees from the intersecting vertical axis. This point can be left or right of the axis depending on which direction the blade is orientated from. In the design illustrated in the drawings, this is currently from the right when viewing the system from the front. However, this invention encompasses designs were the wiper blade assembly is extending from the left. This allows reversal of the entire system orientation.

Ideally, the wiper blade assembly comprises a leading edge blade attached to the wiper blade assembly.

Preferably, the blade is a plastic blade.

Ideally, the wiper blade assembly comprises a plate member.

Preferably, the wiper blade assembly comprises a leading end portion inclined downwardly, at an acute angle preferably less than 30°, from the main plain of the wiper blade assembly.

Ideally, the inclined leading end portion and the main body of the wiper blade assembly are quadrangular plate members.

The skilled man will appreciate that all preferred or optional features of the invention described with reference to only some aspects or embodiments of the invention may be applied to all aspects of the invention.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

BRIEF DESCRIPTION OF DRAWINGS

The invention will now be described with reference to the accompanying drawing which shows by way of example only one embodiment of an apparatus in accordance with the invention.

DETAILED DESCRIPTION OF THE PREFERRED EMBODIMENT

Figure 1:
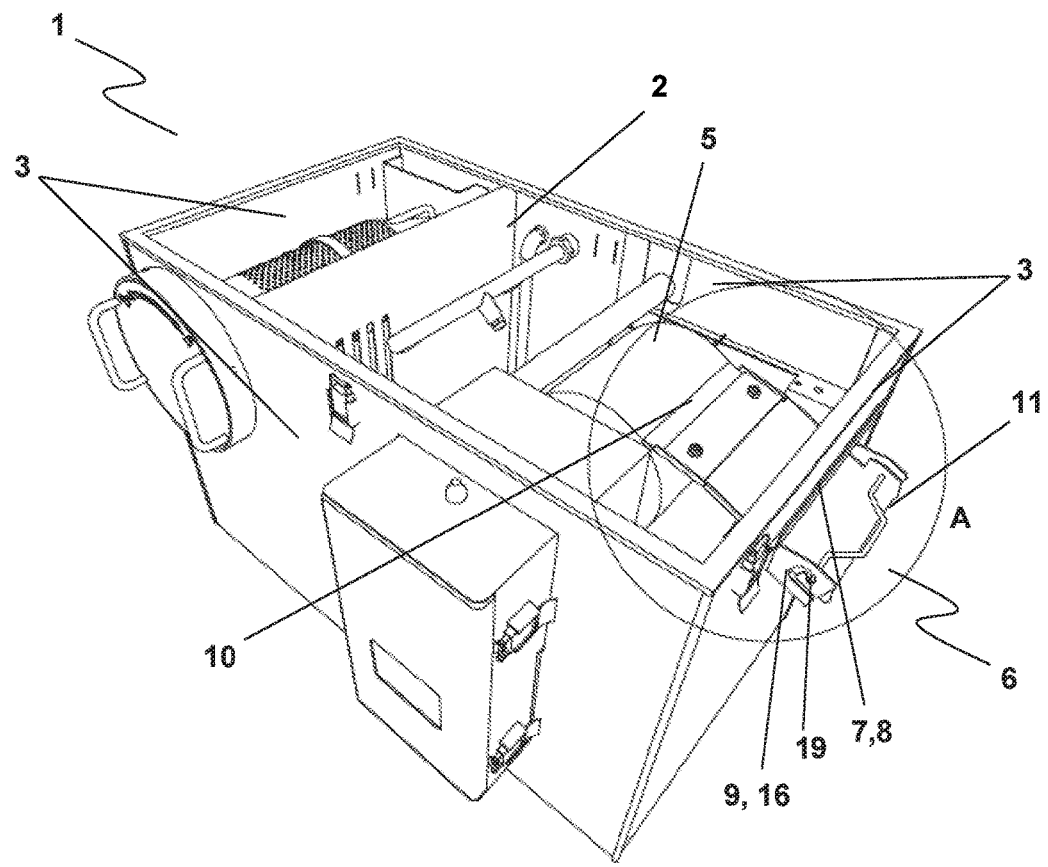
FIG. 1 is a perspective view of a grease recovery device with the wiper blade assembly in a normal working arrangement according to the present invention.

In the drawings, there is shown a grease recovery device indicated generally by the reference numeral 1 having a container 2 with walls 3 and a lid (not shown). The grease recovery device 1 further having a drum 5 for lifting fats, oils, grease and/or solids (FOGS) rotatably mounted on the container 2 and a wiper blade assembly indicated generally by the reference numeral 6. The wiper blade assembly 6 being in operable engagement with the drum 5. A wall 3 of the container 2 has an arrangement 7 for releasably housing the wiper blade assembly 6 in an operational position in the container 2. The releasable housing arrangement 7 comprising an opening 8 for slidably receiving the wiper blade assembly 6 and a support arrangement 9 disposed at or about the opening 8. The wiper blade assembly 6 having a leading end 10 formed for operational engagement with the drum 5 and a trailing end 11 formed for mounting the wiper assembly 6 on the wall 3 of the container 2. The trailing end 11 having engagement mechanism 13 for releasably engaging the support arrangement 9 of the releasable housing arrangement 7. The trailing end 11 engagement mechanism 13 is for locating and releasably retaining the wiper blade assembly 6 on the support arrangement 9 of the container 2 so as to allow the wiper blade assembly 6 to be inserted into and removed from the grease recovery device 1 without removing the lid (not shown) or opening any cover of the container 2. The wiper blade assembly 6 and the releasable housing arrangement 7 are adapted to allow plug and plug operation of the wiper blade assembly 6 in the grease recovery device 1 as well as a quick release operation to remove the wiper assembly 6 from the wall 3 of the container 2.

The releasable housing arrangement 7 provides the opening 8 as an elongate slot. The opening 8 is located just below the top of the drum 5 in the wall 3 of the container 2. The length/width of the opening 8 is formed to be sufficient for receiving the widest part of the wiper blade assembly 6 to be inserted into the container 2. Furthermore, the depth of the opening 8 is formed to be sufficient for receiving the part of the wiper blade assembly 6 having the greatest depth to permit the wiper blade assembly 6 to be inserted at a sufficient angle to make contact with the curvature of the drum 5. This entails the opening 8 having a general width/length in the range of 60 mm to 250 mm and depth in the range of between 10 mm and 60 mm.

The support arrangement 9 has a lateral support member 14 disposed at or about each lateral edge 15 of the opening 8 on the outside of the container 2. The lateral support members 14 having a mechanism 34 for releasably locating and retaining the engagement mechanism 13 of the trailing end 11 of the wiper blade assembly 6.

The lateral support members 14 have a plate 16 extending away from the wall 3 of the container 2 in a direction away from the drum 5. The plate 16 has a blind channel 17 formed through the body of the plate 16 from a free edge 18 of the plate 16 for guiding the engagement mechanism 13 of the wiper blade assembly 6 into a final operational position. At least part of the channel 17 is a curvilinear channel having a sufficient angle of curvature to prevent the wiper blade assembly 6 sliding out of the channel 17 under its own weight. The channel 17 terminates in the body of the plate 16 in such a way as to create a groove 19 for releasably retaining the engagement mechanism 13 of the wiper blade assembly 6. The groove 19 has the body of the plate 16 on one side and a ridge 20 on the other side of the groove 19 creating an operational location for the engagement mechanism 13 of the wiper blade assembly 6.

This channel 17 terminating in a groove 19 provides an arrangement 21 for allowing plug and play operation of the wiper blade assembly 6 into the container 2. The curvilinear channel 17 allows the operator to push the wiper blade assembly 6 into and around the channel 17 in a smooth continuous way into a final operational position in the groove 19 at the end of the channel 17. The groove 19 provides a stop to the travel of the wiper blade assembly 6 in a direction towards or away from the drum 5. The channel 17 has an initial rectilinear portion 22 leading into the body of the plate 16. The rectilinear portion 22 ends with a first bend 23, most preferably a right angle bend turning up into the body of the plate 16 creating a first curvilinear portion of the channel 17. The first bend 23 straightens into a second upwardly extending linear portion 24 of the channel 17. The second linear portion 24 terminates in a second bend portion 25 initially bending back towards the inlet 26 of the channel 17 and finally bending down towards the first rectilinear portion 22 creating the groove 19. In use an operator must lift the trailing end 11 of the wiper blade assembly 6 up and out of the groove 19 to remove the wiper blade assembly 6 from the container 2. This groove 19 prevents the movement of the wiper blade assembly 6 towards or away from the drum 5 without user intervention.

The support arrangement 9 having a lateral support member 16 disposed at or about each lateral edge of the opening 8 provides greater stability for the wiper blade assembly 6 during use. In this aspect by during use we mean during insertion/removal or in the in use operational position of the wiper blade assembly 6. The support arrangement 9 has a base plate 30 disposed along all of the opening 8 for guiding the wiper blade assembly 6 forwards and into/backwards and out of the opening 8 for insertion/removal of the wiper blade assembly 6 into and out of the container 2. The base plate 30 extends between the bottom portion 31 of the lateral support members 14 and inclines upwards towards the opening 8. The support arrangement 9 provides an additional angled part 41 of the base plate 30, the angled part 41 and base plate 30 being the parts upon which the wiper blade assembly sits/slides.

Angled part 41 is located inside the tank behind the elongate slot. It is essentially an upwardly inclined shelf 41 that provides guidance for the wiper blade assembly as it is being inserted into the grease recovery device upwards to the upper portion of the drum 5.

If angled part 41 was not there then the blade could be misguided downwards away from the drum 5. The shelf 41 is integrally formed with the base plate 30. However, it could optionally be a separate part welded or mechanically fixed to the inside of the container tank.

The trailing end 11 of the wiper blade assembly 6 has two laterally protruding male members 32 formed for slidable engagement with the channels 17 of the plates 16. Further, the trailing end 11 of the wiper blade assembly 6 has a handle 33 for inserting and removing the wiper blade assembly 6 to and from the container 2. The handle 33 is a cranked bar extending beyond the wiper blade assembly 6 to provide the two male members 32.

The male members 32 of the trailing end of the wiper blade assembly 6 is a distance from the drum engageable portion of the leading end 10 of the wiper blade assembly 6 such that the engageable portion of the leading end 10 is in operational engagement with the drum 5 of the grease recovery device 1 when the male members 32 are engaged within the groove 19 of the channel 17 in normal use.

Figure 2:
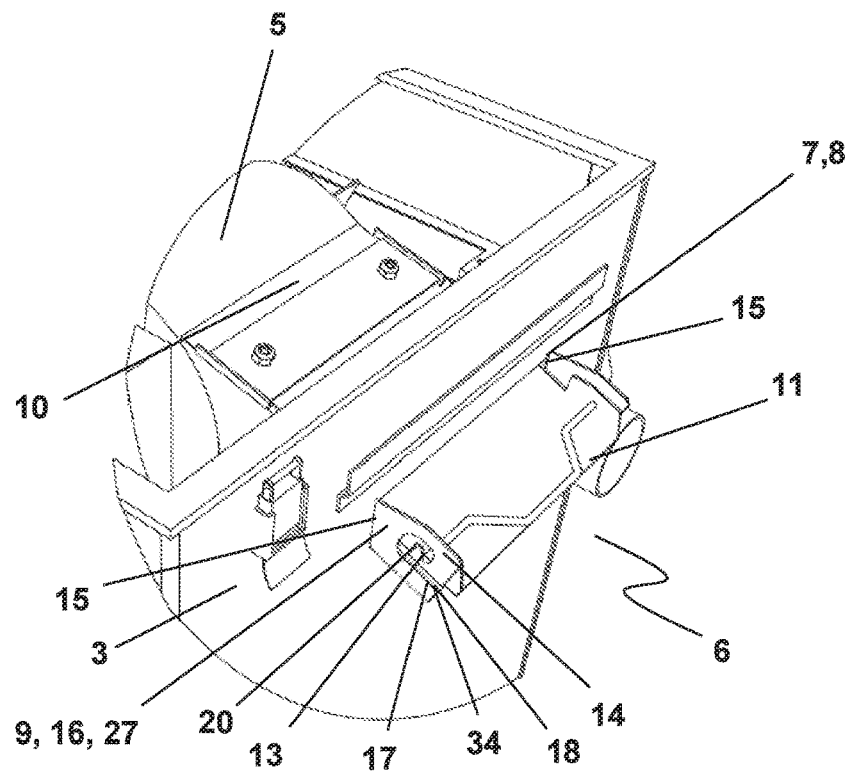
FIG. 2 is a detailed view of region A marked in FIG. 1.
Figure 3:
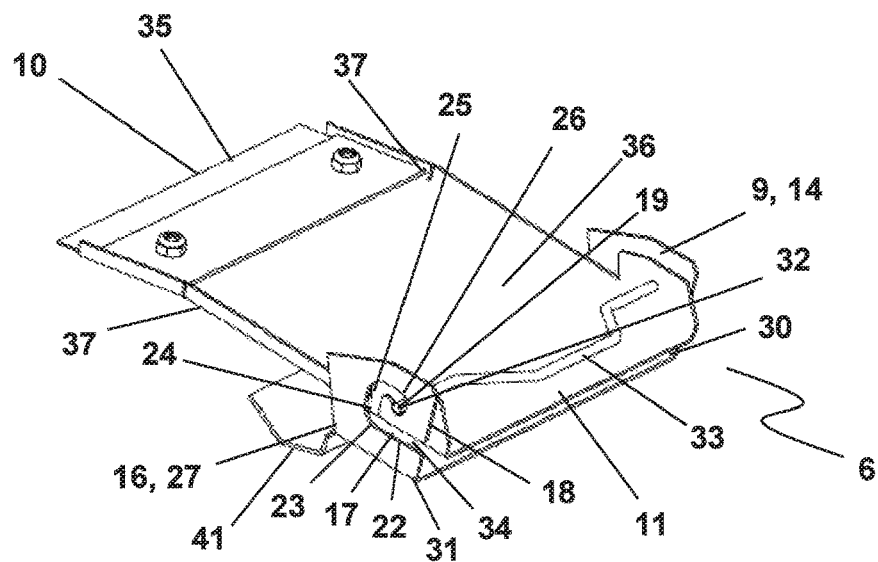
FIG. 3 is a detailed view of the wiper blade assembly according to the present invention.

The wiper blade assembly 6 has a leading edge blade 35 attached formed of a plastic material and a plate member 36 forming the main body of the wiper blade assembly. The leading end portion 10 is inclined downwardly at an acute angle of less than 30° from the main plane of the main body 36 of the wiper blade assembly 6. Both the inclined leading end portion 10 and the main body 36 of the wiper blade assembly 6 are quadrangular plate members (as shown in FIGS. 1 to 3). The lateral edge portions 37 of the wiper blade assembly 6 between the leading end 10 and the trailing edge 11 are upturned a short distance.

The orientation of the drum, the blades, slot and particularly any follow on oil receptacle, is specifically positioned on one of the narrower sides of the main tank container where the container is of a cuboid shape as is this design. The other two longer sides serve as the front side facing the user and the back side facing the wall. Therefore, keeping the drum, the blades, slot and particularly and its follow on container on one of the narrower sides removes these obstructions and is specifically advantageous in maintaining the freedom of movement of the user within the narrow kitchen or other application spaces concerned.

In use, in order to clean the upper blade assembly 6, an operator grabs the handle 33 of the wiper blade assembly 6 upwards so that the male members 32 are released out of the groove 19. The operator pushes the wiper blade assembly 6 so that the male members 32 move across the top of the ridges 20 and down and around the bends (25, 23). The operator then pulls the handle 33 backwards and out along the rectilinear portion 22 of the channel 17, the operator slides the quadrangular plate members 10 and 36 out of the opening 8. The inclined base plate 30 guides the leading end 10 and the quadrangular plate members 10 and 36 back into the container 2 and into the correct orientation to place the leading end 10 of the blade 35 onto the drum 5.

In relation to the detailed description of the different embodiments of the invention, it will be understood that one or more technical features of one embodiment can be used in combination with one or more technical features of any other embodiment where the transferred use of the one or more technical features would be immediately apparent to a person of ordinary skill in the art to carry out a similar function in a similar way on the other embodiment.

In the preceding discussion of the invention, unless stated to the contrary, the disclosure of alternative values for the upper or lower limit of the permitted range of a parameter, coupled with an indication that one of the said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof.

What is claimed is:

1. A grease recovery device, comprising: a container with walls and a lid and a drum for lifting fats, oils, grease and/or solids (FOGS) rotatably mounted on the container, a wiper blade assembly in operable engagement with the drum, a wall of the container having an arrangement for releasably housing the wiper blade assembly in an operational position in the container, the releasable housing arrangement comprising an opening for slidably receiving the wiper blade assembly and a support means disposed at or about the opening, the support means comprising means for locating and releasably retaining the wiper blade assembly on the support means of the container so as to allow the wiper assembly to be inserted into and removed from the grease recovery device without removing the lid or opening any cover of the container.

2. The grease recovery device as claimed in claim 1, wherein the drum also acts as a means of stabilisation for the wiper blade assembly in use.

3. The grease recovery device as claimed in claim 1, wherein the wiper blade assembly has a leading end formed for operational engagement with the drum.

4. The grease recovery device as claimed in claim 3, wherein the drum, in addition to skimming grease acts as a means of guidance for the wiper blade assembly's leading end during insertion/removal.

5. The grease recovery device as claimed in claim 3, wherein the drum also contributes in part to the required resting angle at the leading end of the wiper blade assembly.

6. The grease recovery device as claimed in claim 3, wherein the leading end of the wiper blade assembly makes direct contact with the drum.

7. The grease recovery device as claimed in claim 3, wherein the wiper blade assembly comprises a leading end portion inclined downwardly, at an acute angle, from a main plane of the wiper blade assembly.

8. The grease recovery device as claimed in claim 1, wherein the wiper blade assembly has a trailing end formed for mounting the wiper blade assembly on the wall, the trailing end of the wiper blade assembly having engagement means for releasably engaging the support means of the releasable housing arrangement.

9. The grease recovery device as claimed in claim 8, wherein the support means comprises at least one lateral support member disposed at or about one lateral edge of the opening on the outside of the container, the lateral support member having means for releasably locating and retaining the engagement means of the trailing end of the wiper blade assembly.

10. The grease recovery device as claimed in claim 9, wherein the lateral support member comprises a plate extending away from the wall of the container in a direction away from the drum.

11. The grease recovery device as claimed in claim 10, wherein the lateral support member has a blind channel formed through at least part of the body of the lateral support member from a free edge of the plate for guiding the engagement means of the wiper blade assembly into the lateral support member and along the channel to a final operational position.

12. The grease recovery device as claimed in claim 11, wherein at least part of the channel is a curvilinear channel having a sufficient angle of curvature for preventing the wiper blade assembly from sliding out of the channel under its own weight or otherwise.

13. The grease recovery device as claimed in claim 11, wherein the channel terminates in the body of the lateral support member in such a way as to create a groove for releasably retaining the engagement means of the wiper blade assembly.

14. The grease recovery device as claimed in claim 13, wherein the groove has the body of the lateral support member on one side and a ridge on the other side of the groove creating an operational location for the engagement means of the wiper blade assembly.

15. The grease recovery device as claimed in claim 13, wherein the groove provides a stop to the travel of the wiper blade assembly in a direction towards or away from the drum.

16. The grease recovery device as claimed in claim 11, wherein the trailing end of the wiper blade assembly has at least one laterally protruding male member formed for slidable engagement with the channel of the lateral support member.

17. The grease recovery device as claimed in claim 11, wherein the engagement means of the wiper blade assembly is a distance from the drum engageable portion of the wiper blade assembly such that the drum engageable portion of the wiper blade assembly is in operational engagement with the drum of the grease recovery device when the engagement means of the wiper blade assembly are engaged within the channel in normal use.

18. The grease recovery device as claimed in claim 8, wherein the trailing end of the wiper blade assembly has a handle for inserting and removing the wiper blade assembly to and from the container.

19. The grease recovery device as claimed in claim 18, wherein the handle is a bar extending beyond the wiper blade assembly to provide two male members.

20. The grease recovery device as claimed in claim 18, wherein the trailing end of the wiper blade assembly has locating means on opposite ends thereof for locating the handle.

21. The grease recovery device as claimed in claim 1, wherein the support means comprises a base member disposed along all or part of the opening for guiding the wiper blade assembly forwards and into/backwards and out of the opening for insertion/removal of the wiper blade assembly into and from the container.

22. The grease recovery device as claimed in claim 1, wherein the wiper blade assembly comprises a leading edge blade attached to the wiper blade assembly.

* * * * *